United States Patent [19]

Yoshikawa et al.

[11] Patent Number: 5,078,542
[45] Date of Patent: Jan. 7, 1992

[54] APPARATUS TO PREVENT THE ENTRANCE OF AQUATIC SPECIES INTO THE INTAKE WATERCOURSE

[75] Inventors: Tohru Yoshikawa, Ikoma; Syohei Shimodaira, Wakayama; Mamoru Abe, Nishinomiya; Hidehiko Maehata, Suita; Hiroaki Arai; Hiroyuki Daiku, both of Osaka; Masanori Tsukahara, Ibaraki; Seiji Ohtani, Takarazuka, all of Japan

[73] Assignees: Hitachi Zosen Corporation; The Kansai Electric Power Co., Inc., both of Osaka, Japan

[21] Appl. No.: 658,902

[22] Filed: Feb. 23, 1991

[30] Foreign Application Priority Data

Feb. 26, 1990 [JP] Japan ................................ 2-46498

[51] Int. Cl.⁵ .......................... E02B 9/04; E02B 8/08
[52] U.S. Cl. ........................................ 405/127; 405/81
[58] Field of Search ................ 405/52, 61, 80, 81, 405/84, 118, 127, 211; 119/3

[56] References Cited

U.S. PATENT DOCUMENTS

| | | | |
|---|---|---|---|
| 1,292,246 | 1/1919 | Burkey | 405/81 X |
| 4,058,982 | 11/1977 | Wright | 405/211 |

FOREIGN PATENT DOCUMENTS

| | | | |
|---|---|---|---|
| 60949 | 6/1939 | Norway | 405/127 |
| 684089 | 9/1979 | U.S.S.R. | 405/127 |

Primary Examiner—David H. Corbin
Attorney, Agent, or Firm—Armstrong, Nikaido, Marmelstein, Kubovcik & Murray

[57] ABSTRACT

The present invention provides an apparatus to prevent the entrance of aquatic species into the intake watercourse having a U-shaped cross section with a narrow bottom and a wide surface, in which oppositely facing electrodes are installed vertically along the side walls on both sides of the intake watercourse, and the distance between the upper ends of the electrodes is made greater than the distance between the lower ends of the electrodes, and a voltage is impressed between the both electrodes. Since the electric barrier intensity is smallest at the surface of water and becomes greater as it goes toward the bottom of water, the river fish moving around the bottom of water make a U-turn when they reach the strong electric barrier, or alternatively, after reaching the strong electric barrier, they move upward to where the electric barrier is weaker and then make a U-turn, thereby the entrance of aquatic species into the intake watercourse can be prevented.

1 Claim, 3 Drawing Sheets

APPARATUS TO PREVENT THE ENTRANCE OF AQUATIC SPECIES INTO THE INTAKE WATERCOURSE

FIELD OF THE ART

The present invention relates to an apparatus to prevent the entrance of aquatic species into the intake watercourse, which is intended to prevent the entrance of river fish, such as Ayu, into the intake watercourse for the hydro power station.

BACKGROUND OF THE INVENTION

In the intake watercourse for the hydro power station, entrance of the river fish, such as Ayu, into the intake watercourse may cause problems such as compensation for the river fish.

Conventionally, therefore, a net has been installed near the intake hole of the hydro power station to prevent the entrance of fish, and the interception of the entrance of the fish has been achieved by such net.

In the case of conventional interception by said net, however, the entrance of considerably small fish must be intercepted and therefore a fine-mesh net must be used. This net, however, has such disadvantage as it is easy to break and the interception of fish cannot be secured.

Furthermore, there is another problem that fish may be trapped by said net and the meshes of said net are plugged thereby.

DISCLOSURE OF THE INVENTION

In consideration of the foregoing, the present invention provides an apparatus to prevent the entrance of aquatic species into the intake watercourse, with which the entrance of aquatic species can be securely prevented, and which is free from breakage.

In order to solve the above-mentioned problem, the apparatus to prevent the entrance of aquatic species into the intake watercourse as provided in the present invention comprises oppositely facing electrodes installed vertically along the side walls on both sides of the intake watercourse having a U-shaped cross section with a narrow bottom and a wide surface, in which the distance between the upper ends of both electrodes is made greater than the distance between the lower ends of both electrodes and a voltage is impressed between both electrodes.

According to the apparatus to prevent the entrance of aquatic species into the intake watercourse in the present invention, the component of which is described in the foregoing, oppositely facing electrodes are installed vertically along the side walls on both sides of the intake watercourse, the distance between the upper ends of both electrodes is made greater than the lower ends of both electrodes and a voltage is impressed between both electrodes. Therefore, the electric barrier intensity is smallest at the surface of water and becomes greater as it goes toward the bottom of water.

Therefore, the river fish, such as Ayu, moving around at the bottom of water make a U turn when they reach the strong electric barrier, or alternatively, after reaching said strong electric barrier they move upward to where the electric barrier is weaker and then make a U turn. Entrance of the aquatic species into the intake watercourse can be prevented thereby.

PREFERRED EMBODIMENT OF THE PRESENT INVENTION

The following description will discuss the embodiment of the present invention with reference to the drawings.

Figure 1:
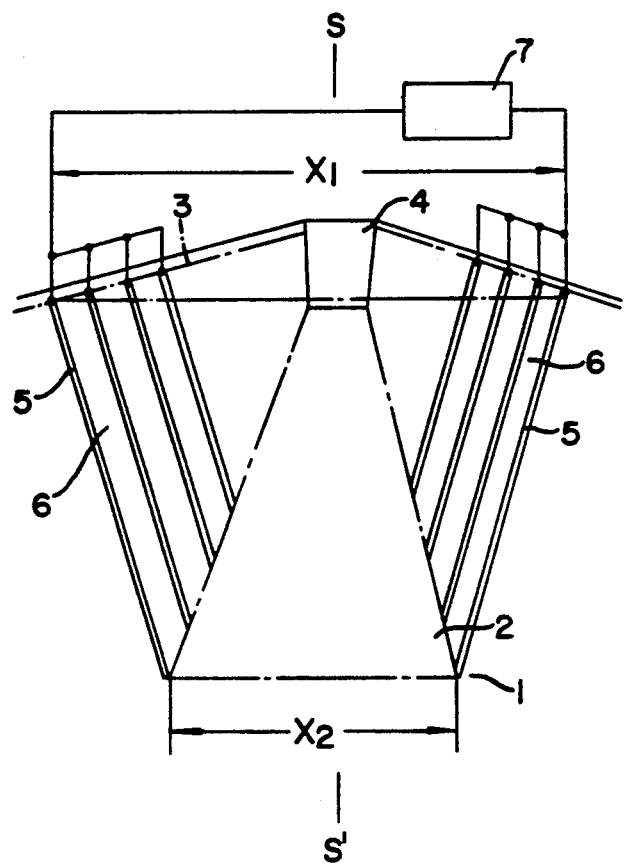
FIG. 1 is a front bird's eye view of one embodiment of the apparatus in accordance with the present invention.

Firstly, in FIG. 1 where one embodiment of the present invention is illustrated, the intake watercourse 1 for the hydro power station has a U-shaped cross section with a narrow bottom 2 and a wide surface 3. The intake watercourse 1 has an intake hole 4 at its end.

A plurality of electrodes 5, which are either linear, bar-shaped, band shaped, or else, are installed vertically along the side walls 6 on both sides of the intake watercourse 1. The electrodes 5 installed along both left and right side walls 6 are facing opposite to each other, and the distance $X_1$ between the upper ends of the oppositely facing electrodes 5 is made greater than the distance $X_2$ between the lower ends of both electrodes 5.

One end of the direct current power supply 7 is connected to each electrode 5 along the left side wall 6, while the other end is connected to each electrode 5 along the right side wall 6.

Figure 2:
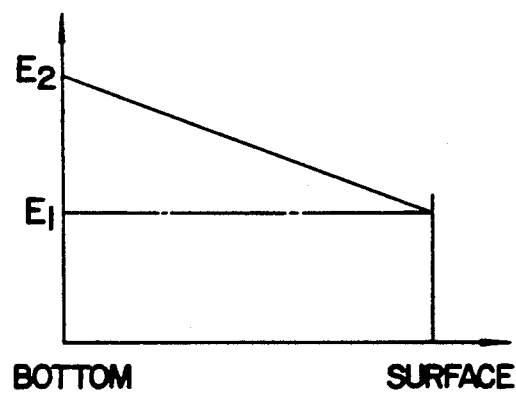
FIG. 2 illustrates the distribution of the electric barrier intensity of FIG. 1.

It is now assumed that the distance $X_1$ between the upper ends is twice the distance $X_2$ between the lower ends. In this case, the distribution of the electric barrier intensity at the position of S-S' line in FIG. 1, namely in the middle of both left and right electrodes 5 is such that the electric field intensity $E_2$ at the bottom of water is twice the electric field intensity $E_1$ at the surface of water, as illustrated in FIG. 2.

Figure 3:
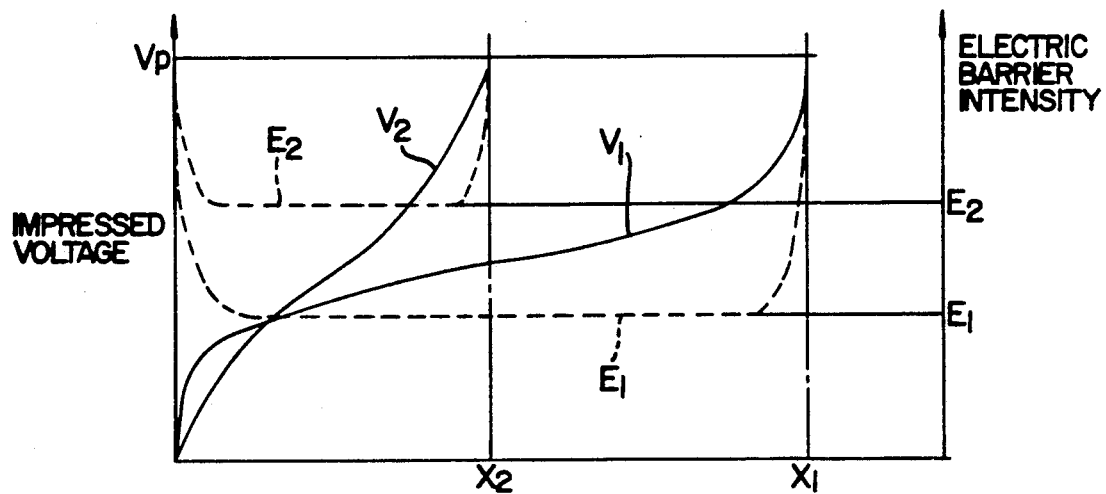
FIG. 3 illustrates the voltage distribution and the electric barrier intensity of FIG. 1.

Further, FIG. 3 illustrates the voltage distribution and the electric barrier intensity between the upper part of the electrodes 5 and between the lower part of the electrodes 5. The impressed voltage, the voltage between the upper part of the electrodes, and the voltage between the lower part of the electrodes are indicated as $V_p$, $V_1$ and $V_2$, respectively.

Figure 4:
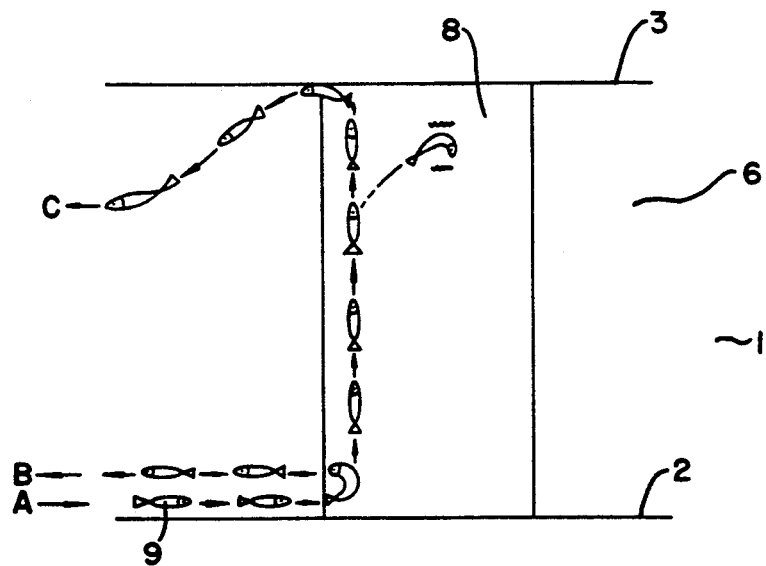
FIG. 4 is a side view of a part of FIG. 1.

Further, in FIG. 4 which shows the side view of FIG. 1, when a river fish 9, such as Ayu, reaches the electric barrier field 8 from one direction as indicated by Arrow A, it then make a U-turn to escape in the direction as indicated by Arrow B.

Alternatively, the fish may, after entering the electric barrier field 8, move upward to where the electric barrier intensity is small and escape in the direction as indicated by Arrow C.

It is now assumed that the oppositely facing electrodes 5 on both sides 6 are parallel and the upper and the lower ends of the electric barrier fields 8 have an equal barrier intensity. In this case, the fish 9 receives an electrical shock while it moves upward within the electric barrier field 8 and is caught in a stream to the other end of the electric barrier field 8. In the case where the electric barrier intensity becomes smaller as it goes upward according to the present invention, it becomes easier for the fish to take evasive behavior by making a U turn without receiving an electrical shock.

Figure 5:
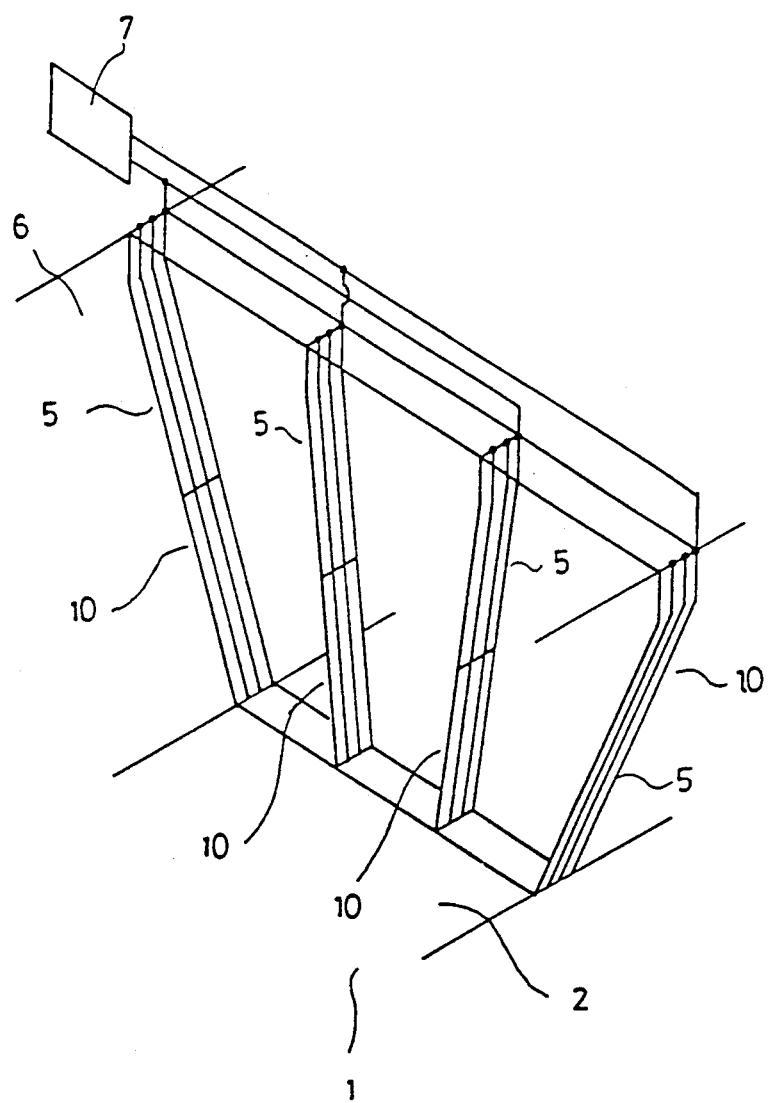
FIG. 5 is a skew view of another embodiment of the present invention.

Further, FIG. 5 shows another embodiment of the present invention. Two additional electrodes 5 in addition to those described in FIG. 1, are installed between both sides 6 of the intake watercourse, each electrode group 10 being connected to the power supply 7 to form alternate electrodes.

The present invention which comprises the above-explained components exerts the following effects.

Oppositely facing electrodes 5 are installed vertically along the side walls 6 on both sides of the intake watercourse 1, the distance $X_1$ between the upper ends of oppositely facing both electrodes 5 is made smaller than the distance $X_2$ between the lower ends of both electrodes 5, and a voltage is impressed between both electrodes 5. Since the electric barrier intensity of the intake watercourse 1 is smallest at the surface of water and becomes greater as it goes toward the bottom of water, the river fish 9, such as Ayu, moving around the bottom of water makes an evasive U-turn when they reach a strong electric barrier, or alternatively move upward to where the electric barrier is weaker and then make a U-turn. The entrance of aquatic species into the intake watercourse 1 can be thereby prevented.

What is claimed is:

1. An apparatus to prevent the entrance of aquatic species into the intake watercourse having a U-shaped cross section with a narrow bottom and a wide surface, said apparatus comprising oppositely facing electrodes installed vertically along the side walls on both sides of said intake watercourse, the distance between the upper ends of said electrodes being greater than the distance between the lower ends of said electrodes, and a voltage being impressed between said both electrodes.

* * * * *

UNITED STATES PATENT AND TRADEMARK OFFICE
CERTIFICATE OF CORRECTION

PATENT NO. : 5,078,542

DATED : January 7, 1992

INVENTOR(S) : Tohru YOSHIKAWA et al

It is certified that error appears in the above-identified patent and that said Letters Patent is hereby corrected as shown below:

On the title page, Item [22], "February 23, 1991" should read -- February 22, 1991 --.

Signed and Sealed this

First Day of June, 1993

Attest:

MICHAEL K. KIRK

*Attesting Officer*   *Acting Commissioner of Patents and Trademarks*